US006618480B1

(12) United States Patent
Polley et al.

(10) Patent No.: US 6,618,480 B1
(45) Date of Patent: Sep. 9, 2003

(54) DAC ARCHITECTURE FOR ANALOG ECHO CANCELLATION

(75) Inventors: Michael O. Polley, Richardson, TX (US); William J. Bright, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/070,092

(22) Filed: Apr. 30, 1998

Related U.S. Application Data

(60) Provisional application No. 60/045,114, filed on Apr. 30, 1997.

(51) Int. Cl.[7] ................................................. H04M 1/00
(52) U.S. Cl. ............................ 379/406.05; 379/406.11; 379/406.12
(58) Field of Search ................... 379/93.05, 399–400, 379/402, 406, 410–411, 416; 370/280–291; 375/222, 226–227, 229–233, 219, 285, 296

(56) References Cited

U.S. PATENT DOCUMENTS

| | | | | |
|---|---|---|---|---|
| 4,995,030 A | * | 2/1991 | Helf | 379/410 |
| 5,166,924 A | * | 11/1992 | Moose | 379/410 |
| 5,317,596 A | * | 5/1994 | Ho et al. | 379/411 |
| 5,623,513 A | * | 4/1997 | Chow et al. | 375/219 |
| 5,659,581 A | * | 8/1997 | Betts et al. | 370/290 |

* cited by examiner

*Primary Examiner*—George Eng
(74) *Attorney, Agent, or Firm*—Wade James Brady, III; Frederick J. Telecky, Jr.

(57) ABSTRACT

Echo cancellation in data communication between modems utilizes analog echo cancellation to lessen reduction of usable dynamic range of the received signal at the input to the analog-to-digital converter (DAC) in the receiver. Two digital-to analog (D/A) conversions are provided in the modem's analog front end (AFE). One generates the analog signal for transmission. The other generates an analog representation of a cancellation signal that is used to electronically cancel the echo before analog-to-digital (A/D) conversion of the received signal. A preferred embodiment utilizes multiplexed DAC architecture to emulate two DACs by sharing DAC circuitry between data paths of the two D/A conversions.

1 Claim, 5 Drawing Sheets

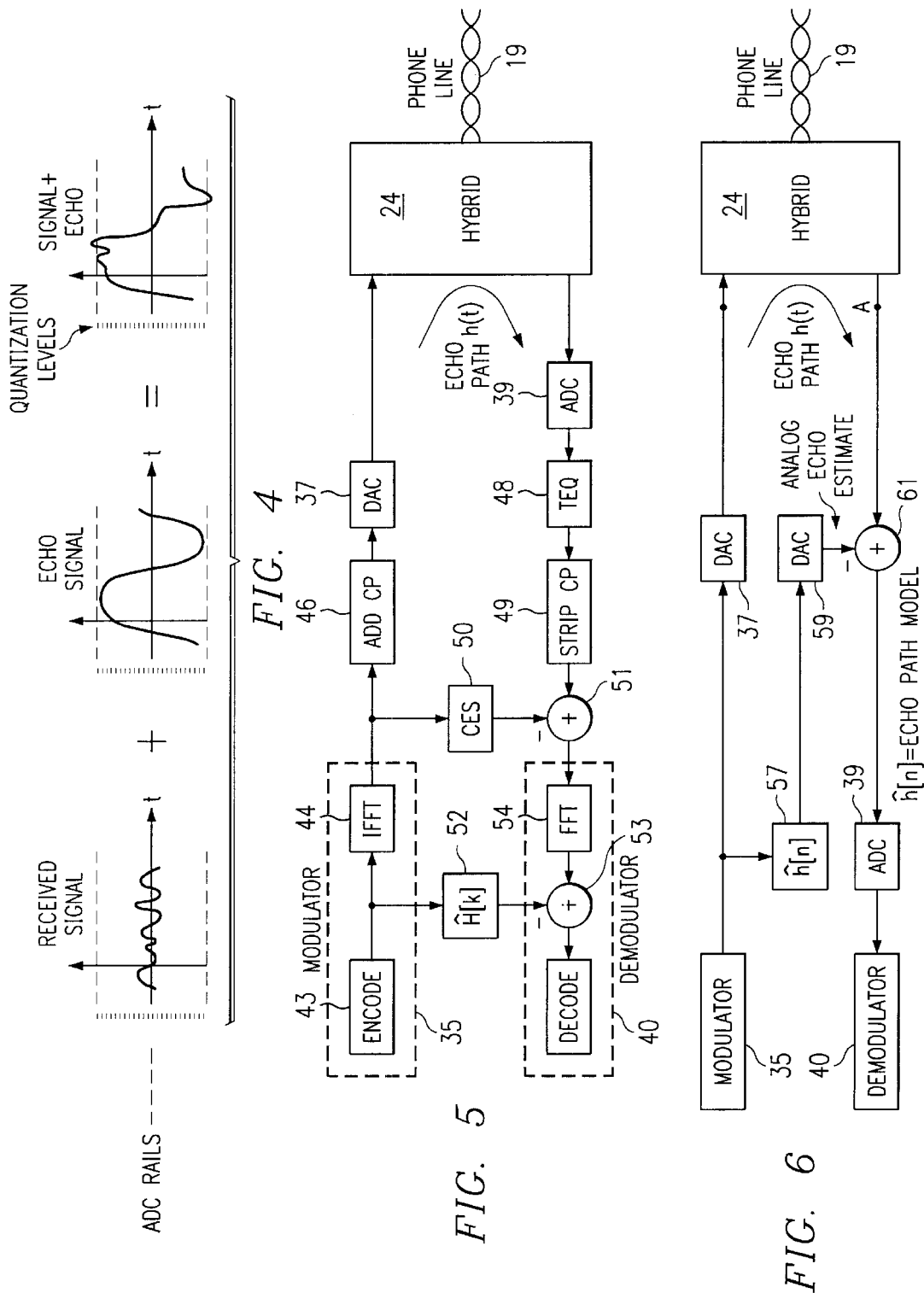

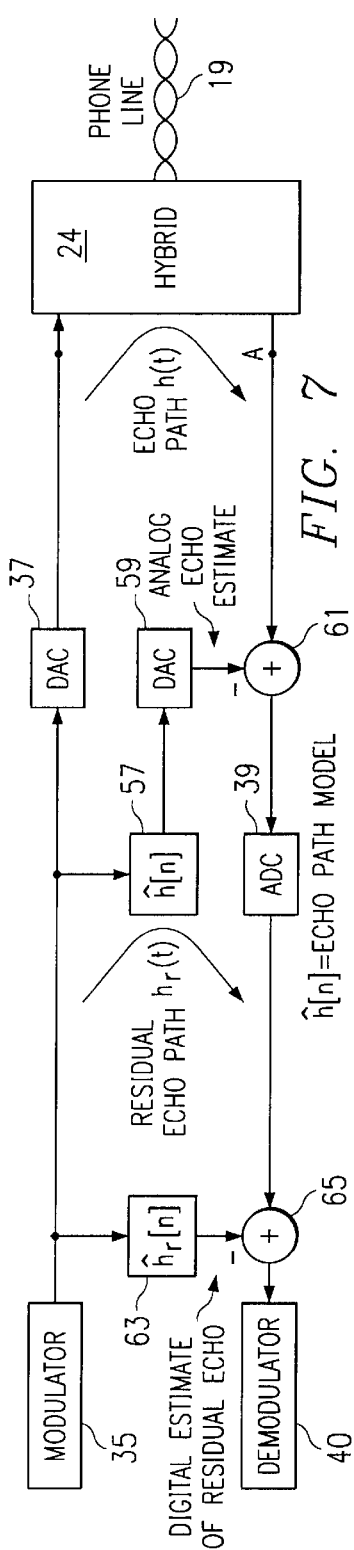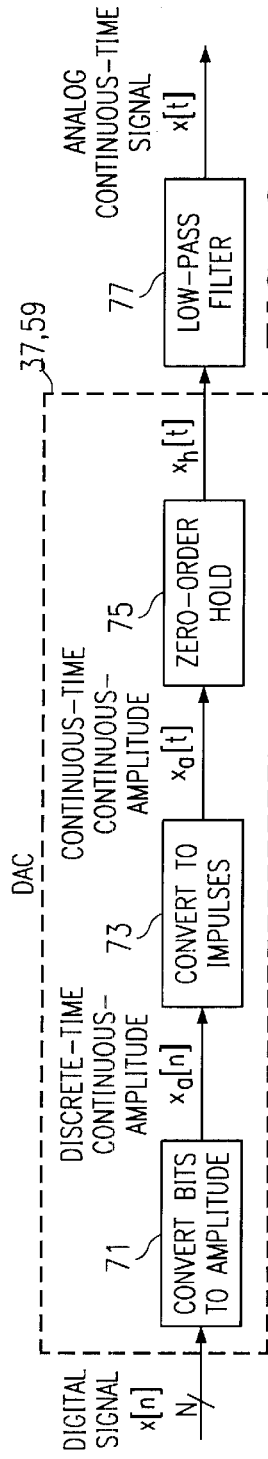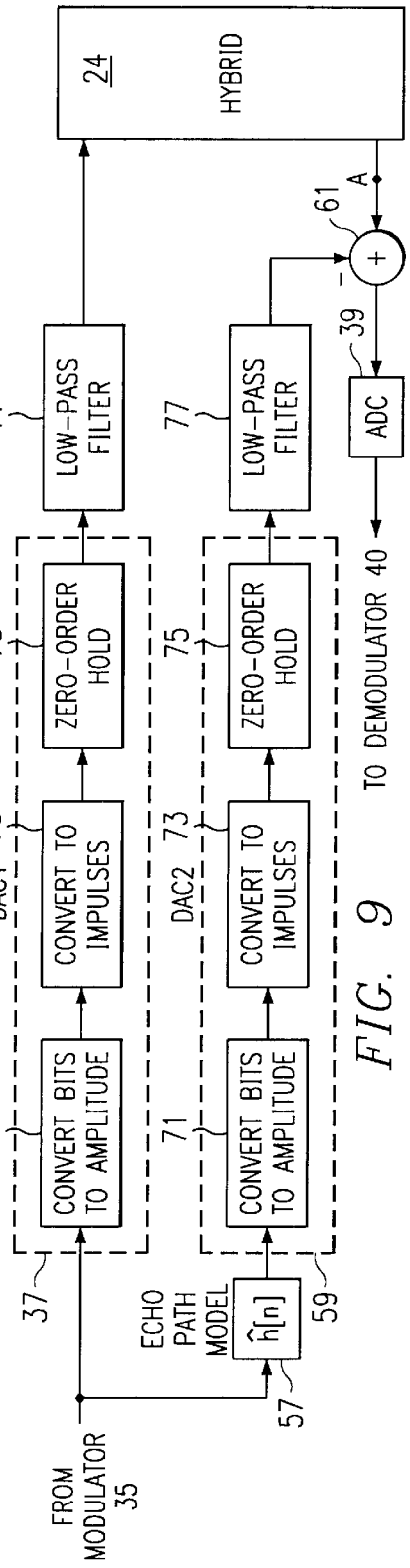

DAC ARCHITECTURE FOR ANALOG ECHO CANCELLATION

This application claims priority under 35 USC §119(e)(1) of provisional application Ser. No. 60/045,114 filed Apr. 30, 1997, the entirety of which is incorporated herein by reference.

This invention relates generally to digital signal communication; and, in particular, to methods and apparatus for separating received and transmitted signals in digital communication over wired transmission media utilizing modems.

BACKGROUND OF THE INVENTION

Digital communication over wired transmission media is achieved by launching electromagnetic signals onto the wires at one end and capturing them at the other end of transmission lines. Wired transmission media include metallic wires, pairs or sets of metallic wires used together, coaxial cables, and even optical fiber. A point-to-point communication link over a wired transmission line can support two-way communications using transceivers at each end of the wire that feature both transmit and receive capabilities. Full-duplex modems support simultaneous transmit and receive capabilities by applying electronic and/or modulation techniques to separate the received signal from the transmitted signal.

An illustrative digital subscriber line (xDSL) implementation of two modems 10, 12 communicating over a twisted-pair copper wire transmission line 14 connecting a telephone company central office (CO) to a customer premises is shown in FIG. 1. At the transmission line input to the near end modem, just past line coupling circuitry 15, the total signal is formed by superposition of the signal transmitted from the near end 10 and the signal received from the far end 12. To support simultaneous communication in both directions (full-duplex operation), some method of separating the received signal from the transmitted signal must be employed so that a transmitter 16 and receiver 18 in each modem 10, 12 can operate simultaneously. A popular method incorporates balanced line coupling circuitry to ensure that 100% of the signal to be transmitted is transferred to the transmission line 14 and 0% is reflected back into the receive path, eliminating all interference into the received signal. In the case of twisted-pair copper wire telephone transmission lines, the line coupling circuitry 15 converts the two-wire bidirectional transmission line 14 to a four-wire path with separate unidirectional transmit and receive circuits 21, 22. This line coupling circuit (and converter) is often referred to as a "hybrid." See, Whitman D. Reeve, "Subscriber Loop Signaling and Transmission Handbook: Digital" (IEEE Press, Piscataway, N.J. 1995), pages 54–56, incorporated herein by reference. The two-wire transmit and receive paths 21, 22 shown can accommodate differential signals like those conveyed on the phone line or single-ended signals, depending on the hybrid design. For single-ended signals, one wire of the pair conveys the signal and the other provides a ground signal reference.

FIG. 2 shows an electronic hybrid 24 that converts a differential two-wire telephone line 14 to separate single-ended transmit and receive paths 21, 22. (Electronic hybrids featuring differential transmit and receive terminal outputs are very similar, so are not discussed further here.) A transformer 26 provides magnetic inductive coupling of the hybrid circuitry 24 to the telephone line 14. The signal received from the far end passes through transformer 26 to terminal A (FIG. 2), which is connected directly to the positive terminal of a receive amplifier 27. The transmit signal input to transformer terminal A is determined by a voltage divider formed by a resistor R (28) and an impedance Zi, where Zi is the input impedance looking into transformer 26. Zi is a function of the transformer impedance as well as the phone line impedance. To remove the transmit signal from the receive path 22, a cancellation voltage is generated at terminal B by another voltage divider formed by a resistor R (31) and a balance impedance Zb (32). The cancellation voltage is input to the negative terminal of the receive amplifier 27 and only the difference between the negative and positive terminals of the amplifier 27 is passed through as the received signal (common-mode voltages are rejected). See, Paul Horowitz and Winfield Hill, "The Art of Electronics: second edition" (Cambridge University Press, 1989), incorporated herein by reference. If Zb=Zi, then the cancellation voltage exactly matches the transmit voltage and no transmit signal is passed through the receive amplifier 27. This is a complete electronic cancellation.

If Zb is not exactly equal to Zi, an impedance mismatch occurs at line coupling circuitry, 15 and a portion of the transmitted signal, called the echo, will be included in the output of the receive buffer. Any echo that leaks into the receive path 22 will interfere with the attenuated signal from the far end. Characteristics of the echo signal are determined by the specific circuit elements used in the hybrid 24 and the input impedance Zi of transformer 26. The echo can be described by the convolution of the transmitted signal x(t) and h(t), the impulse response describing the echo path through the hybrid 24. The severity of the impedance mismatch determines the magnitude of the echo, which is often defined as echo return loss (ERL), a logarithmic measure of the ratio of power of the transmitted signal to the power of the echo. A very high ERL indicates that very little transmit signal is echoed back, while a low ERL means that the echo is large. The ERL in an xDSL transceiver may be as low as 6 dB in some cases and the signal from the far end may be attenuated by as much as 70 dB. Thus, the received signal may be as much as 64 dB below the echo!

Under controlled conditions, where the hybrid line coupling can be tuned to match the line, the echo can be made arbitrarily small. However, manual tuning is undesirable for cost effective deployment of wireline modems. A better approach is to design the matching circuitry to provide an acceptable level of echo suppression over a wide range of anticipated line conditions. The system should be designed to operate reliably in the presence of echoes produced under the range of anticipated line conditions. This can be achieved with the proper selection and design of modulation techniques and receive circuitry.

Various modulation techniques are available for signal separation. To achieve co-existing transmission and reception in the presence of significant echo due to impedance mismatch in the hybrid circuit 24, a data duplexing method can be incorporated into the modulation technique to help separate the bidirectional data traffic. For example, frequency-division duplexing (FDD) or time-division duplexing (TDD) can be used to separate the outgoing and incoming signals from one another in frequency or time, respectively. However, both FDD and TDD systems sacrifice channel capacity to facilitate signal separation. The idea in both FDD and TDD systems is to consider the transmitted signal as an unwanted and unknown interference into the received signal. The aim of both systems is to remove the unwanted component.

FDD systems place the transmitted signal in a different portion of the frequency spectrum than is occupied by the received signal. The ANSI T1E1.413 specification (ADSL standard) supports FDD operation. See, "T1.413-1995: Telecommunications—Asymmetric Digital Subscriber Line (ADSL) Metallic Interface " (1995), incorporated herein by reference. Both transmit and receive functions are operated simultaneously, but throughput capacity in either direction is sacrificed because the full bandwidth is not used. TDD techniques separate the outgoing and incoming signals by turning off the transmit portion in order to extract the incoming signal without interference. When transmit mode is entered, the transceiver no longer attempts to receive data. This method has been proposed for the evolving VDSL standard. See, ANSI Contribution T1E1.4/96-329R1, DMT Group VDSL PMD Draft Standard Proposal (February 1997), incorporated herein by reference. Several VDSL proposals refer to the TDD scheme as "ping pong" because the modems take turns sending the information back and forth. TDD also sacrifices throughput capacity because transmission and reception do not occur simultaneously—only a portion of the total time is used for each.

Because the transmitter and receiver are co-located in the same transceiver of a wireline modem, the receiver portion can exploit knowledge of the transmitted signal to extract the reflected portion of it from the receive path. Algorithmic echo cancellation techniques can be applied to first estimate the hybrid echo path, synthesize a cancellation signal based on the transmitted signal and an estimate of the hybrid echo path, and then subtract the cancellation signal from the received signal to alleviate interference. Because the transmitter and receiver operate simultaneously and occupy the full bandwidth for the entire time duration, echo cancellation systems are superior because they provide a higher theoretical capacity for transmitting data.

An example of an echo cancellation system is shown in FIG. 3. A modulator 35 produces transmit symbols that are passed through a digital-to-analog converter (DAC) 37. The DAC output is sent to the electronic hybrid circuit 24 which places the transmitted signal on the phone line 14. The signal received from the far end passes through hybrid 24 and into the input of an analog-to-digital converter (ADC) 39. The echo of the transmitted signal from hybrid 24 is also present at the ADC input. Thus, ADC 39 generates a digital representation of the superimposed signals. To cancel the unwanted echo, the receiver (here, shown as demodulator 40) forms an estimate $\hat{h}[n]$ of the echo path. This can be done once and saved. The transmitted symbols are convolved with $\hat{h}[n]$ at 41 to form an estimate of the echo. The echo estimate is subtracted at 42 from the ADC output to produce an echo-free estimate of the received signal that is passed to demodulator 40 for further decoding.

FIG. 4 shows an example of a received signal and an echo signal superimposed at the input of ADC 39. The ADC amplitude rails are set to accommodate the composite signal and a discrete number of available amplitude quantization levels are distributed between the rail values. The composite signal is quantized to the ADC amplitude values. The digital estimate of the echo signal is then subtracted to produce the received signal. However, the received signal is very small compared to the echo signal, so only occupies a small portion of the possible signal range. This results in a larger amount of quantization noise in the received signal than would be present if the received signal occupied the entire range of the ADC input. There is, thus, a need to have an echo cancellation system that has a reduced level of quantization noise.

An example of a hybrid time/frequency based echo cancellation system that operates with a discrete multitone (DMT) receiver of an ADSL modem application is shown in FIG. 5. An encoder 43 produces transmission symbols which are grouped into blocks that are processed with an inverse fast Fourier transform (IFFT) operation (44). A cyclic prefix (CP) is added to the IFFT output at 46 and the result is passed through DAC 37, into hybrid 24, and onto phone line 19. The incoming signal passes from phone line 19 through hybrid 24 and into ADC 39. The total ADC input is the superposition of the received signal and the echo of the transmitted signal that is reflected back through hybrid 24. The ADC output is a digital representation of the superimposed inputs. The ADC output is passed through a time-domain equalizer 48 and the cyclic prefix is removed at 49. A combination of time and frequency domain techniques are used to remove the echo from this signal. A circular echo synthesizer (CES) 50 is used to make the echo appear periodic so that it can be canceled in the frequency domain at 51. See, Richard C. Younce, Peter J. W. Melsa & Samir Kapoor, "Echo Cancellation for Asymmetrical Digital Subscriber Lines," Proceedings of the International Conference on Communications (1994), incorporated herein by reference.

According to a basic Fourier transform property, circular convolution of two sequences in the time-domain is equivalent to complex multiplication of their Fourier transforms. See, Alan V. Oppenheim & Ronald W. Schafer, "Discrete-Time Signal Processing," (Prentice Hall, N.J., 1989), incorporated herein by reference. Thus, CES 50 serves to make the convolution of the transmitted signal and the cyclic-looking hybrid echo path appear circular. A frequency-domain estimate of the CES-enhanced echo is synthesized by multiplying the frequency-domain representation of the transmitted signal at 52 by a frequency-domain estimate H[k] of the hybrid echo path. The synthesized echo is then subtracted at 53 from the frequency-domain representation of the CES enhanced signal at the output of fast Fourier transform (FFT) operation 54. A more thorough description of frequency-domain techniques can be found in the literature. See, Minnie Ho, John M. Cioffi & John A. C. Bingham, "High-Speed Full-Duplex Echo Cancellation for Discrete Multitone Modulation," Proceedings of the International Conference on Communications (1993), incorporated herein by reference.

SUMMARY OF THE INVENTION

As described, full-duplex wireline communication between two modems requires techniques for sharing the wire for transmission in both directions. Electronic hybrid circuits in conjunction with digital echo cancellation techniques provide one way to do this. Such techniques suffer, however, from large quantization noise because the echo signal is larger than the received signal at the input to the ADC. To maintain a large analog dynamic range of the received signal at the input to the analog-to-digital converter in the receiver, an analog echo cancellation approach is proposed. The approach utilizes two digital-to-analog conversions in the modem's analog front end (AFE). One generates the analog signal for transmission. The other generates an analog representation of a cancellation signal that is used to electronically cancel the echo before analog-to-digital conversion of the received signal. To reduce the size, power, and complexity of the modem's AFE, a preferred embodiment of the invention utilizes multiplexed DAC architecture to emulate two DACs by sharing DAC circuitry between data paths of the two digital-to-analog conversions. Signal processing algorithms are utilized to compensate for differences in output signals of the two DAC paths that result from using a multiplexed DAC architecture. In the frameworks of wireline modems, the additional compensation processing has minimal impact because it can be grouped with other signal processing algorithms in the modem.

BRIEF DESCRIPTION OF DRAWINGS

FIG. 4 shows an example of how the received signal and the echo signal are superimposed at the ADC input. Because the ADC amplitude rails are set to accommodate the composite signal, the received signal will only occupy a small portion of the possible signal range after the echo signal is removed. This results in a larger amount of quantization noise than would be present if the received signal occupied the entire range of the ADC input.

FIG. 5 shows a digital time-/frequency-domain echo cancellation architecture for DMT-based transceivers.

FIG. 6 shows a digital/analog time-domain echo-cancellation architecture.

FIG. 7 shows a digital/analog time-domain echo-cancellation architecture.

FIG. 8 shows a simple representation of the functions served by a digital-to-analog (DAC) converter.

FIG. 9 shows the constituent parts of two DACs shown in the framework of an analog echo cancellation modem architecture.

DETAILED DESCRIPTION OF PREFERRED EMBODIMENTS

Figure 1:
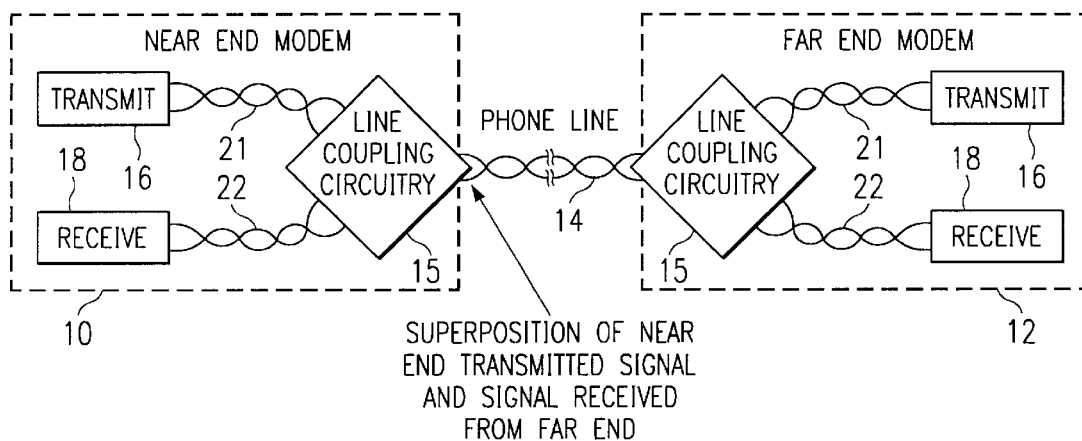
FIG. 1 shows two full-duplex modems communicating over a twisted pair telephone line.
Figure 2:
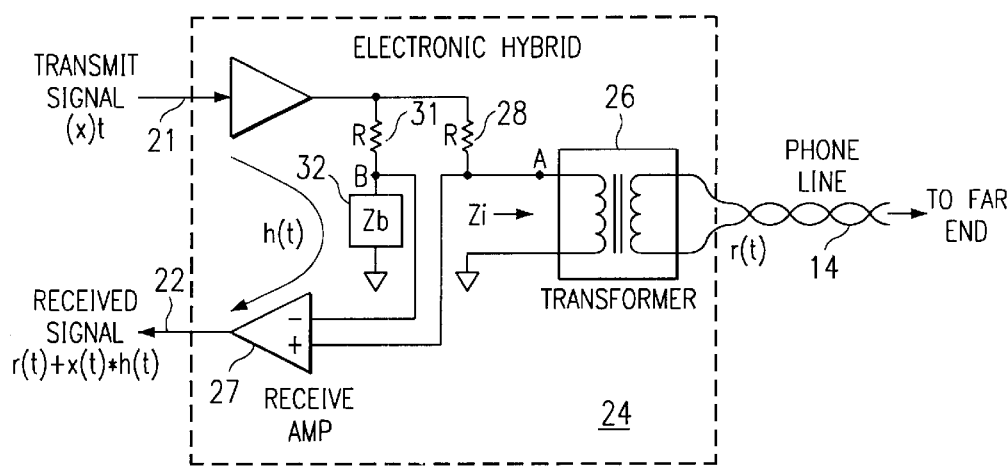
FIG. 2 shows an electronic hybrid that converts the bidirectional phone line into two separate unidirectional transmit and receive paths.
Figure 3:
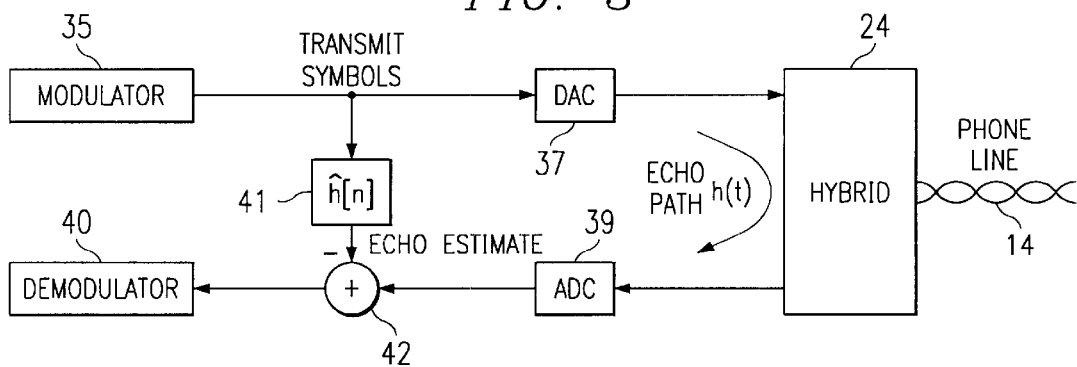
FIG. 3 shows a digital time-domain echo cancellation architecture.

A disadvantage of the conventional digital echo cancellation, described in the Background section above, is the high level of quantization noise due to the large magnitude of the echo signal relative to the received signal. The ADC input range must be set to accommodate the superposition of the received signal and the echo signal. When the echo signal is much larger than the received signal, the quantization noise on the received signal is large even after removal of the echo. A lower quantization noise and higher performance can, however, be achieved by quantizing the received signal alone, without interference from the echo.

FIG. 6 shows a method for removing the echo before conversion to the digital domain by the ADC 39. Transmitted digital symbols from the modulator 35 are converted to an analog signal by DAC 37. The analog signal is coupled onto phone line 19 by electronic hybrid circuit 24. The incoming signal from phone line 19 passes through hybrid 24. At hybrid terminal A, the signal is a superposition of the received signal and the echo. An analog echo estimate is synthesized by forming a digital estimate ĥ[n] of the echo. The digital transmission symbols are convolved with ĥ[n] at 57 and the result is passed through a second DAC 59 to produce an analog estimate of the echo. The analog estimate is then electronically subtracted from the superimposed received and echo signals at 61 to form an estimate of the received signal which is then converted to a digital representation by ADC 39. Because of difficulties in producing an exact analog echo estimate, an amount of echo interference may remain. Digital techniques, like those previously described, can be applied to cancel this residual echo.

A practical combination of analog and digital echo cancellation might be implemented as shown in FIG. 7. The analog estimate is formed in the same manner as discussed in the previous paragraph. However, complexity requirements are relaxed by allowing ĥ[n] to be a rough estimate of the hybrid echo path. This results in a less precise analog echo estimate at 57 which is then subtracted at 61 from the composite signal at terminal A. The imperfect estimate will result in a partially uncancelled echo component at the input to ADC 39. A reasonable design criterion is to achieve an uncancelled echo component that has about the same power level as the received signal component. Under these conditions, each signal alone would occupy almost the entire range of the ADC. The ADC output will contain the partially uncancelled echo component. A second echo path model ĥr[n] can be estimated to describe the characteristics of the residual echo path (which includes the analog echo canceler). The transmitted symbols are convolved with ĥr[n] at 63 to form a digital estimate of the residual echo which is then subtracted at 65 from the ADC output to form an echo-free estimate of the received signal, as the input to demodulator 40.

Frequency-domain echo cancellation for DMT systems can also be combined with analog echo cancellation techniques in the same manner for a similar performance increase.

Analog echo cancellation techniques provide performance advantages for wireline modems. However, the addition of a second DAC 59 to produce the analog echo estimate increases the complexity, size, and power requirements. For this reason, a preferred embodiment of the invention provides a more efficient architecture for implementing the analog portion of a wireline modem, which utilizes a DAC circuitry that is shared between two DAC data paths.

A simple representation using signal processing terminology of the components of a digital-to-analog converter (DAC) 37 or 59 is shown in FIG. 8. This example is representative, and not limitative of the preferred circuitry to implement the converter. The input signal x[n] is a discrete-time sequence of values—each value represented in binary form using N bits. In the first stage 71, each N-bit digital value is converted to a discrete-time sequence of voltage or current amplitude values $x_a[n]$. The sequence is then converted at 73 to a train of impulses spaced T seconds apart, with the amplitude of each impulse representing a value of the input sequence $x_a(t) = \Theta_n x_a[n]\delta(t - nT)$. This continuous-time continuous-amplitude impulse train $x_a(t)$ is then passed through a zero-order hold (ZOH) 75 to produce a continuous-time continuous-amplitude DAC output signal $x_h(t)$. Because the effects of ZOH 75 may produce undesirable spectral effects [see, Alan V. Oppenheim & Ronald W. Schafer, "Discrete-Time Signal Processing," (Prentice Hall, N. J. 1989), incorporated herein by reference], a low-pass filter 77 is included at the output to help provide the desired frequency-domain characteristics in the output signal x(t).

Figure 10:
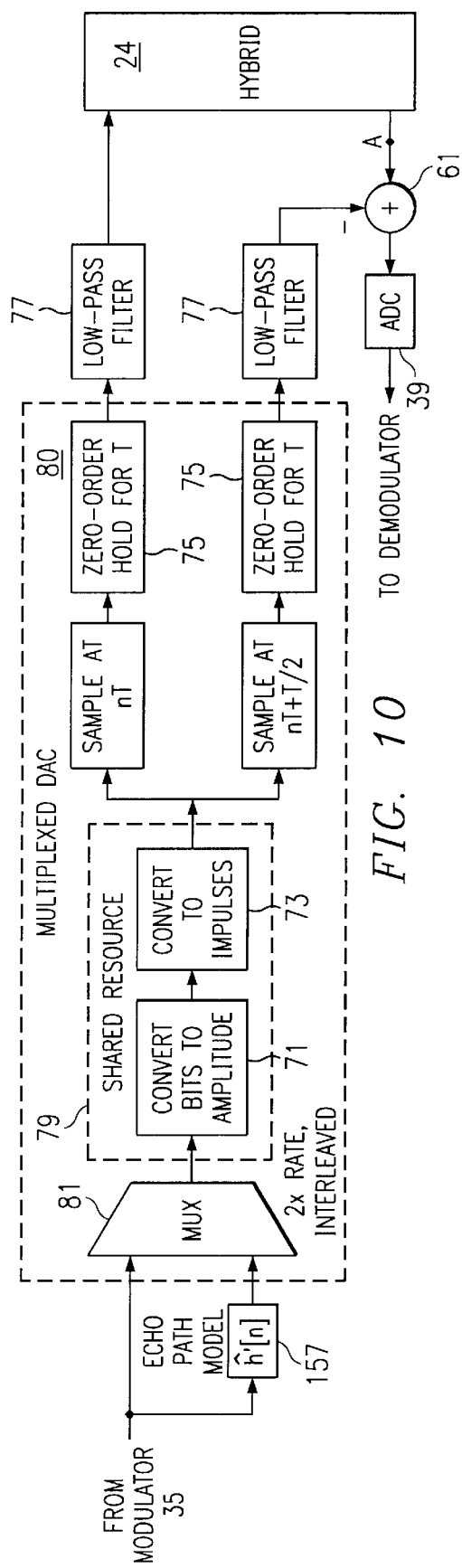
FIG. 10 shows a basic multiplexed-DAC architecture.

FIG. 9 illustrates the various DAC operations in the context of a dual-DAC wireline modem that features analog echo cancellation, such as described above with reference to FIGS. 6 and 7. When the modem design incorporates two identical DACs 37, 59, there is a large amount of duplication in the two data paths. This can be avoided, as shown in FIG. 10, by providing a shared resource 79 in a modified DAC architecture 80 which takes the place of the two DACs 37, 59 in arrangements like those of FIGS. 6 and 7. A multiplexer (MUX) 81 enables multiplexing resource 79 between the separate DAC paths on a sample-by-sample, alternating basis. The FIG. 10 arrangement shares the bit-to-amplitude conversion 71 and conversion of a discrete-time sequence to a continuous-time impulse train 73. Circuit speed and performance is increased for those portions of the conversion to operate at twice the speed to provide the same overall throughput, as the data propagating through resource 79 will be twice that propagating through the previously described single DACs 37 and 59. This can be pictured as a sequence with twice the number of values and a train of impulses with half the spacing as in the separate, single DAC configuration.

Because the two DAC outputs are inherently continuous in time and independent of each other, the conversion from impulses to two continuously varying signals is accomplished with dedicated conversion circuitry for the two paths; utilizing separate zero-order hold (ZOH) circuits 75.

In the separate DAC 37, 59 implementation, the ZOH 75 converts the input impulses spaced T seconds apart into square pulses of length T whose amplitudes are the same as the impulses. In practical systems, the edges of the pulses are smoothed slightly. In the multiplexed DAC 80 implementation, the impulse train with spacing T/2 is demultiplexed and the alternating samples directed to the separate ZOH circuits to provide outputs that are continuous over a period of length T.

Figure 12:
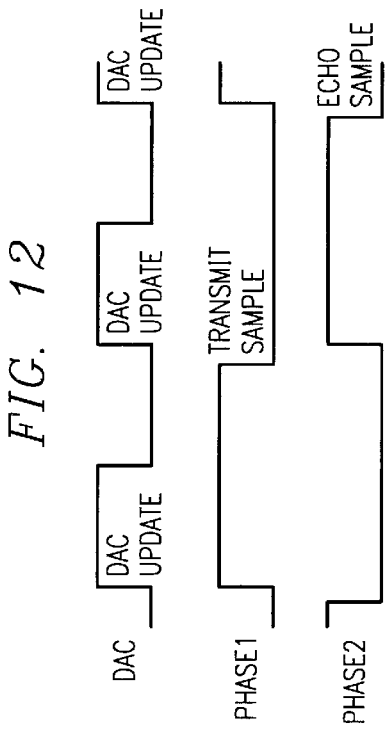
FIG. 12 shows the timing of the DAC clock relative to the transmit and echo cancellation sampling clocks.
Figure 11:
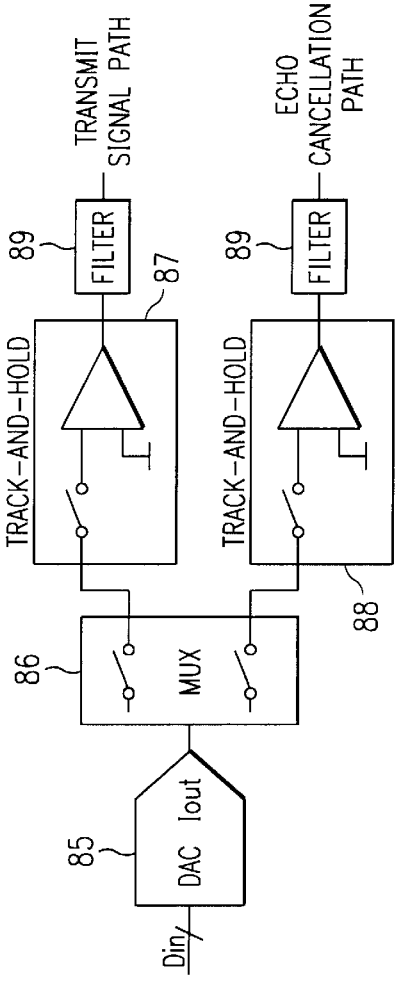
FIG. 11 shows time-multiplexed analog echo cancellation using, a single digital-to-analog converter.

One implementation of the multiplexed DAC 80 analog echo cancellation architecture is illustrated in FIG. 11. It uses a current steering DAC 85, a MUX 86, two track-and-hold circuits 87, 88 and two filter circuits 89 connected as shown. DAC 85 operates with a sampling rate of Ts, where Ts is greater than or equal to four times the analog signal bandwidth for both the transmit and echo cancellation channels. A DAC operating at two times oversampling or higher is used because the DAC is being multiplexed between two channels. The current output of the DAC represents the analog signal amplitude conversion of the digital input accurate to within an error defined by the resolution of the DAC circuitry. The multiplexed DAC architecture of FIG. 11 uses a two-phase non-overlapping clock with a period equal to two times that of the DAC sampling clock. The DAC clock and the two phase non-overlapping clock signals for the track-and-hold circuits 87, 88 are shown in FIG. 12.

Figure 13:
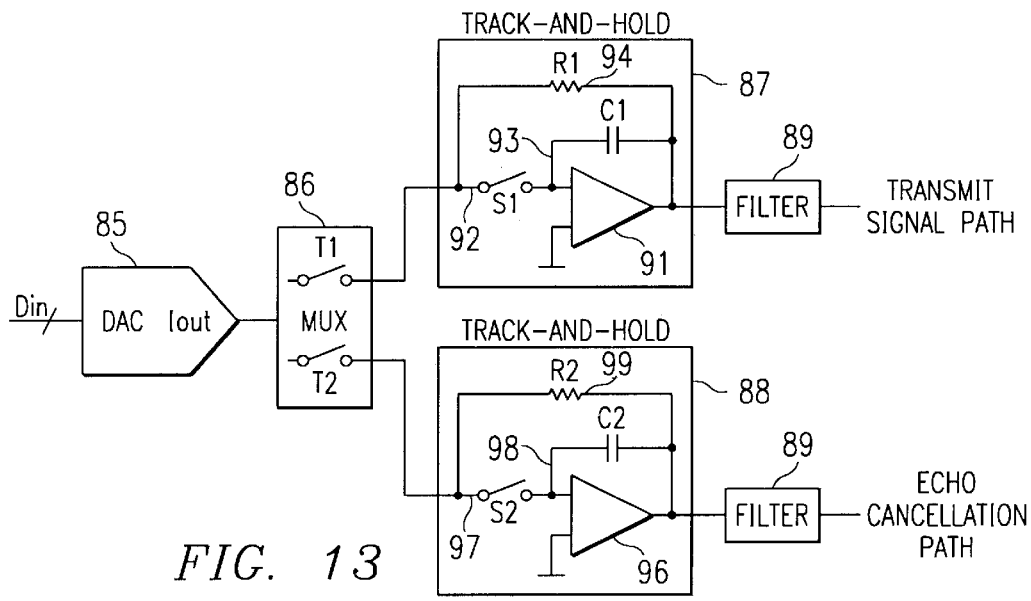
FIG. 13 shows a multiplexer and track-and-hold circuit implementation.

The output current of the DAC is multiplexed between track-and-hold circuits 87, 88, one of which is dedicated to each of the transmit and echo cancellation channels. Suitable circuitry is generally described in M. Nayebi & B. A. Wooley, "10-bit Video BiCMOS Track-and-Hold Amplifier," IEEE Journal of Solid State Circuits, Vol. SC-24, pp. 1507–1516, Dec. 1989, incorporated herein by reference. MUX 86 may be a CMOS transmission gate in which switch T1 is closed when phase 1 clock is high and switch T2 is closed when phase 2 clock is high. Track-and-hold circuit 87 may comprise an amplifier 91, sampling switch S1 (92), sampling capacitor C1 (93), and a feedback resistor R1 (94), as shown in FIG. 13. The track-and-hold circuit 88 comprises an amplifier 96, a sampling switch S2 (97), a sampling capacitor C2 (98) and a feedback resistor R2 (99). Circuits 87, 88 can be identical, with the only difference in operation being in the phase of the clock on which the corresponding track-and-hold is initiated.

For example on the rising edge of both the DAC clock and phase 1 clock signals, the DAC 85 output current updates, the transmit channel sample switch S1 is closed and the updated DAC current Iout is switched to the transmit track-and-hold circuit 87 via the closed multiplexer 86 switch T1. With switch S1 closed, track-and-hold circuit 87 (transmit channel) converts the DAC 85 output current (Iout=Idac1) to an analog output voltage of proportional value, where Vout1=Idac1 R1. The voltage Vout1 that develops across the feedback resistor 94 charges the sampling capacitor C1, where Qout1=C1 Vout1. This process has the entire time of phase 1 of the clock to settle to the resolution requirement of the system. The sampling switch S1 is opened on the falling edge of phase 1 and Qout is stored on the sampling capacitor C1. This stored charge allows the output voltage, Vout1 sampled by capacitor C1 to remain, or rather be "held" at the amplifier 91 output.

On the rising edge of the phase 2 and DAC clock signals, DAC 85 updates, sampling switch 97 in the echo cancellation track and hold circuit 88 closes and multiplexer 86 switches the updated DAC output (Iout=Idac2) to the track-and-hold circuit 88. Track-and-hold circuit 88 develops an output voltage Vout2=Idac2 R2. Sampling capacitor C2 stores a charge proportional to the output voltage Qout2=C2 Vout2 and has the high portion of the phase 2 clock to settle. On the falling edge of the phase 2 clock signal, this charge is sampled on capacitor C2 and the output voltage Vout2 remains at the amplifier output of the echo cancellation path. It should be noted for the above example that DAC 85 is updating on the rising edge of both the phase 1 and phase 2 clock signal waveforms. This update rate or conversion rate of DAC 85 is twice the update rate of the transmit and echo path track-and-hold outputs. In addition, the transmit channel updates on the rising edge of the phase 1 clock and the echo cancellation path updates on the rising edge of the phase 2 clock signal. The transmit and echo cancellation paths, thus update 180 degrees out of phase from each other and hold their updated output voltage for the entire period of the applicable phase 1 or phase 2 clock signal.

A method for multiplexing the DAC output between the transmit and echo cancellation paths has been discussed. The track-and-hold function holds an output voltage Vout while not connected to the DAC output. This function is needed since the output of each track-and-hold is connected to the input of a filtering circuit. A typical implementation of the filtering function is done with a switched capacitor equivalent to an RLC prototype. See, for example, D. J. Allstot & K. S. Tan, "Simplified MOS Switched Capacitor Ladder Filter Structures," IEEE Journal of Solid State Circuits, vol. SC-16, pp. 724–729 (Dec. 1981), incorporated herein by reference. What is relevant here is not the switched capacitor circuit itself, but the action and requirements of the input stage to the switched capacitor filter. An input stage for the switched capacitor filter is illustrated in FIGS. 14A and B.

Figure 14A:
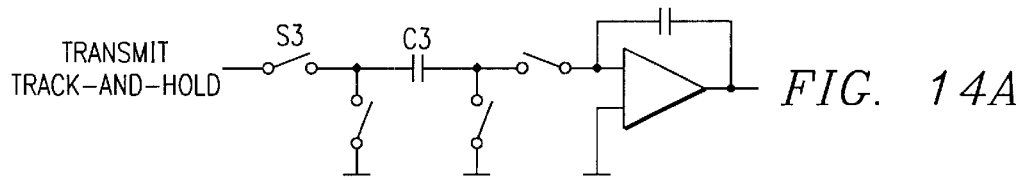
FIGS. 14A and B show the input stage to the switched capacitor filters for both the transmit and echo cancellation signal paths.
Figure 14B:
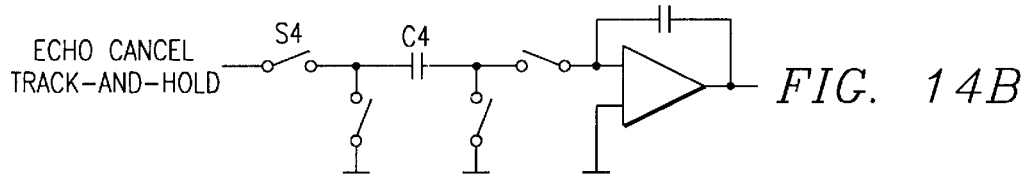

In FIGS. 14A and B, it is shown that the sampling capacitors C3 and C4 are connected to the transmit and echo cancellation track-and-hold outputs via switches S3 and S4, respectively. The clock waveform for these switched capacitor filters is shared and shown relative to the DAC and track-and-hold clock signals in FIG. 15.

Figure 15:
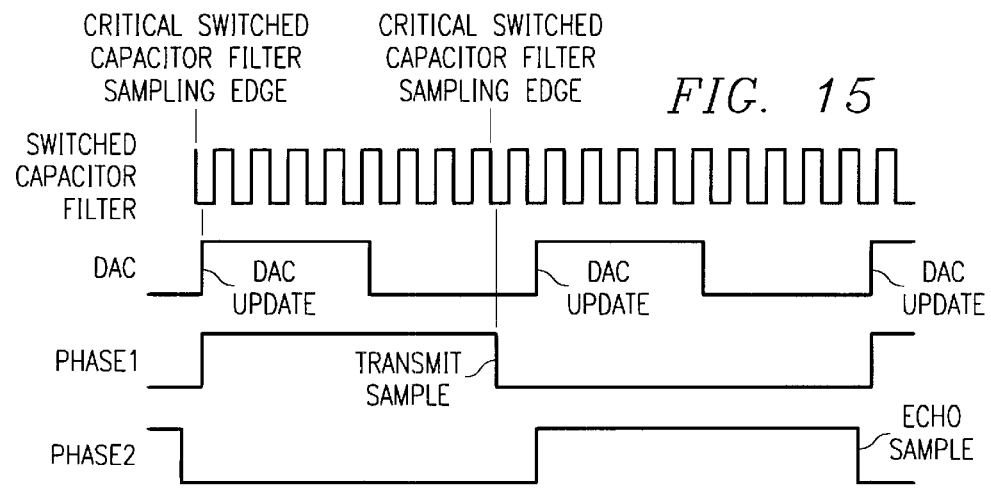
FIG. 15 shows clock waveforms showing timing relationship between switched capacitor filters, DAC and track-and-hold circuits for both the transmit and echo cancellation paths.

The clock frequency of the switched capacitor filters is typically greater than 20 times that of the input signal bandwidth. For ADSL systems this would give a clock signal for the switched capacitor filters of greater than 20 MHz. The sampling instant of the switched capacitor filters is defined on the falling edge of the clock signal. As shown in FIG. 15, timing should be chosen so that the sampling edge of the filter clock signal is sufficiently spaced from the sampling instant of the track and hold function, so that any "glitch" associated with the track-and-hold function will settle and not be sampled by the filter.

The multiplexed DAC architecture will produce two signals that are slightly different in nature than the output of two independently operating DACs. However, compensation for these differences can be incorporated into the normal signal processing algorithms employed in wireline modems without a large increase in complexity. Two phenomena that affect the multiplexed-DAC outputs that would not influence the outputs from two separate DACs are considered below.

While one path through the multiplexed DAC has the same sample times as a single DAC would, the other path has a T/2 time delay associated with it. This is because the DAC inputs are first multiplexed, and the samples for one data path will occupy the DAC circuitry for time intervals of length T/2 starting at multiples of T, while the data in the other path will occupy the DAC circuitry for the same time intervals, but starting at multiples of T plus a time offset T/2. Therefore, one output of the multiplexed DAC will be delayed by T/2. This phenomenon is associated with the shown architecture design. This delay relative to the main signal can be alleviated by placing a T/2 analog delay circuit in the other data path through the multiplexed DAC to resynchronize the output signals. However, precise analog delay circuits may be difficult to implement.

A preferred technique for resolving problems caused by the T/2 time offset is to compensate for the offset in the signal processing algorithms that are digitally implemented in wireline modems. For modem applications, the second path is used for analog echo cancellation. Therefore, the signal synthesized by the echo canceler will have the half-sample delay. The half-sample delay can be considered during analysis of the echo path through the hybrid and calculation of the model parameters used to cancel the echo. For example, consider the cancellation signal c(t) that is produced when the hybrid model ĥ[n] is convolved with the transmit symbols and passed through a single DAC. Also consider the cancellation signal $c_m(t)$ produced from the multiplexed DAC, and a different hybrid model ĥ'[n]. If the multiplexed DAC were used with ĥ'[n]=ĥ[n], then the resulting cancellation signal would be $c_m(t)=c(t-T/2)$. One could achieve $c_m(t)=c(t)$ by upsampling the DAC input by a factor of two, performing near-ideal interpolation between samples, advancing the signal by one sample, then downsampling to produce the correct DAC input. While this procedure produces the desired result, a more straightforward solution is to incorporate knowledge of the T/2 delay into the model parameter computation.

An example of how to modify the model parameter computations for a typical wireline modem is given here. A large class of model computation algorithms use a frequency-domain performance criteria and adaptation algorithms to adjust the time-domain coefficients until some minimum level of performance is achieved. A conventional training algorithm that is used to form a model for the hybrid echo path in wireline modems uses a least-mean-square (LMS) algorithm to adapt the time-domain coefficients to force the frequency-domain response of the model to approach a desired response. When the time-domain coefficients form a filter that will be convolved with the signal that goes out through the multiplexed-DAC path with the T/2 delay, the delay can be pre-compensated by including an inverse effect in the frequency-domain design criteria. If the model estimation algorithm for a single DAC attempts to converge to a frequency-domain representation of H[k], then the target frequency response can be modified to be $H[k]e^{-j2\pi f\, T/2}$. The exponential term adds a linear phase component of $-2\pi$ f T/2 to the prior target frequency response. Multiplication by this linear phase term results in the inverse frequency response having an advance of one-half sample. It will appear as though the upsample, interpolate, advance, and resample had been applied.

The multiplexed-DAC circuit described above can potentially suffer from track-and-hold effects. The track-and-hold circuit was used to provide the demultiplexing of the discrete-time data into two continuous-time data streams. Because the impulse response of the discrete-to-continuous time circuits varies slightly from that of a regular DAC, the multiplexed DAC outputs will be slightly different. However, compensation for these effects can also be applied in the digital signal processing operations applied before the DAC inputs. This operation is very similar to the sin(x)/x compensation techniques commonly employed in the transmit filtering operations in a variety of communications applications. See, for example, Alan V. Oppenheim & Ronald W. Schafer, "Discrete-Time Signal Processing" (Prentice Hall, N.J. 1989), incorporated herein by reference.

Those skilled in the art to which the invention relates will appreciate that various substitutions and modifications can be made to the described embodiments, without departing from the spirit and scope of the invention as defined by the claims.

What is claimed is:

1. A method for separating a received signal from superimposed received and echoed transmitted signals in digital communication over a transmission medium, wherein digital transmit symbols from a modulator are converted from digital to analog form and coupled onto the transmission medium through an electronic hybrid circuit as a transmitted signal, and an incoming analog signal is concurrently received from the transmission medium through the hybrid circuit as the received signal and converted from analog to digital form for demodulation by a demodulator, the method comprising the steps of:

forming a digital estimate h[n] of an echo path of an inverse fast Fourier transformed (IFFT) transmitted digital signal;

convolving the digital transmit symbols with the digital estimate h[n] to form a digital echo estimate;

converting the digital echo estimate from digital to analog form to produce an analog echo estimate an echo;

subtracting the analog echo estimate from an analog form of the superimposed received and echoed transmitted signals to form an analog estimate of the received signal to provide the received signal with removed estimate of the echo therein;

converting the analog estimate of the received signal from analog to digital form to produce a digital estimate of the received signal; and further including the steps of:

providing a second residual echo path model of the transmitted digital signal after said IFFT which is an estimate of the echo of the characteristics of the remaining echo in said converted analog estimate of the echo in said received signal;

subtracting said second residual echo path model from said digital estimate of the received signal to form an echo-free estimate of the received signal; and then performing a fast Fourier transform (FFT) on said echo-free estimate of the received signal.

* * * * *